United States Patent [19]

Côme

[11] 4,217,922
[45] Aug. 19, 1980

[54] FLUID RESERVOIR

[75] Inventor: Philippe Côme, Dammartin en Gôelle, France

[73] Assignee: Societe Anonyme D.B.A., Paris, France

[21] Appl. No.: 23,791

[22] Filed: Mar. 26, 1979

[51] Int. Cl.² ............................ B65D 1/24; F15B 7/10
[52] U.S. Cl. ...................................... 137/265; 220/22; 60/592
[58] Field of Search ....................... 60/562, 592, 585; 220/22; 137/255, 265

[56] References Cited
U.S. PATENT DOCUMENTS

| | | | |
|---|---|---|---|
| 3,147,596 | 9/1964 | Wallace | 60/562 |
| 3,989,056 | 11/1976 | Reinartz | 137/265 X |
| 4,147,270 | 3/1979 | Brandon | 60/562 |

*Primary Examiner*—Alan Cohan
*Attorney, Agent, or Firm*—Paul David Schoenle; Ken C. Decker

[57] ABSTRACT

The invention relates to a fluid reservoir with two compartments, more particularly for supplying hydraulic fluid to tandem master cylinders, this reservoir more specifically comprising two complementary, superjacent parts connected with adhesive, by thermowelding or by any other equivalent method, a central partition attached to the said parts and running across the longitudinal axis of the reservoir to divide the reservoir interior into two compartments having respective outlet orifices, at least one compartment also having a filler orifice, and the two compartments being interconnected by a transfer passage which extends into both of them and runs parallel to the surface of the fluid in the reservoir and substantially at the maximum level for this fluid. The transfer passage enables the hydraulic fluid to pass from one reservoir compartment into the other when the reservoir is filled with hydraulic fluid. However, it must be designed so that enough fluid is retained in each of the compartments, which are connected to respective chambers of the tandem master cylinder, when the vehicle accelerates or decelerates quite hard or when it is parked on a steep slope.

6 Claims, 6 Drawing Figures

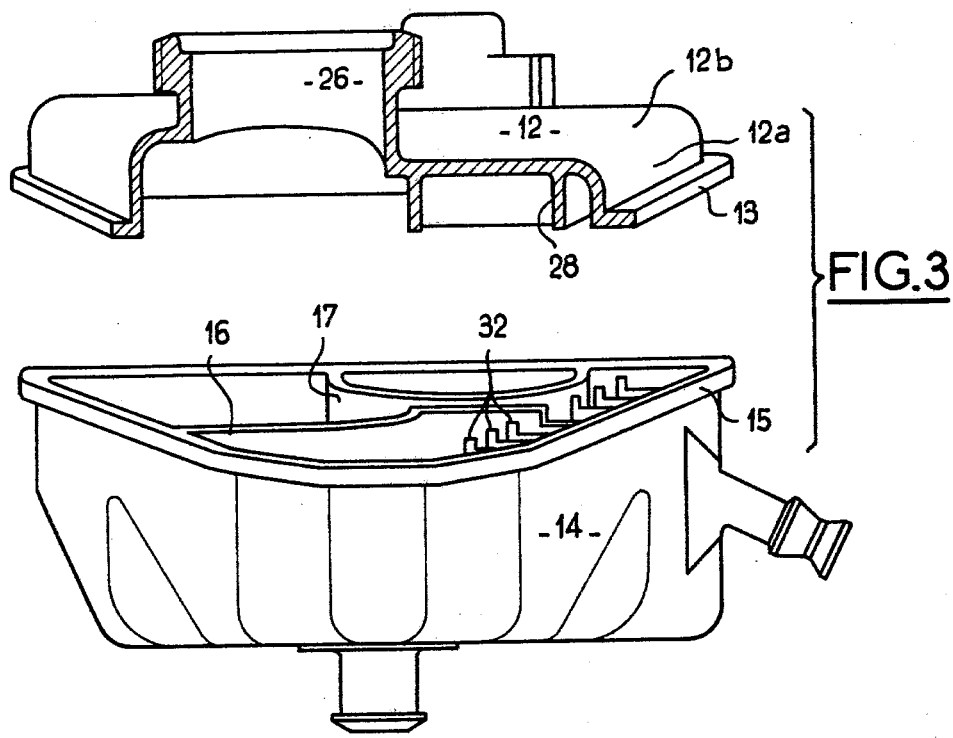
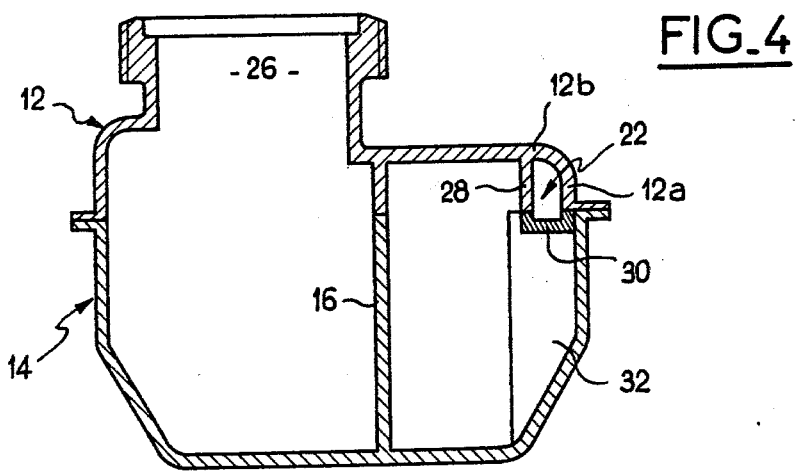

FLUID RESERVOIR

One reservoir of this type is described in British patent specification No. 1,316,937, in which a deflector plate parallel to the surface of the liquid cooperates with the reservoir cover to define a passage of reduced cross-section between the two compartments.

U.S. Pat. No. 3,147,596, on the other hand, describes, with reference to a reservoir integral with its master cylinder, the provision of a transfer passage of circular cross-section in the central partition, the passage extending approximately halfway into each of the two reservoir compartments.

These known designs in the state of the art all have the disadvantage that the insertion and attachment of the transfer passage requires one or more additional operations which cannot but increase the cost of making the reservoir.

An object of this invention is to overcome the above stated disadvantage by designing the transfer passage in such a way that it is easy to insert and can be fixed in position without adding any manufacturing operations.

To this end, according to the invention, in a fluid reservoir of the type described above, the transfer passage itself comprises two complementary, superjacent, profiled portions, namely a lower portion substantially forming a gutter mounted on the lower part of the reservoir and an upper portion attached to the upper part of the reservoir, the said portions together defining a closed cross-section, and the connection plane of the portions making up the passage coincides at least approximately with that of the parts making up the reservoir, so that the whole can be assembled in a single operation.

According to another feature of the invention, the transfer passage runs along at least one of the side walls of the reservoir and its upper portion is formed by the actual side wall of the upper reservoir part, by the adjoining marginal zone of its top and by a vertical rib integral with the said reservoir part and parallel to the said side wall.

According to a further feature of the invention, the lower passage portion comprises a substantially U-shaped section of which the upwardly directed uprights are aligned respectively with the said side wall and with the rib on the upper reservoir part.

According to yet another feature of the invention, the section is distinct from the lower reservoir part, and it rests on the bottoms of correspondingly shaped recesses in the central partition of the reservoir and in transverse partition members integral with the lower reservoir part and thus acting as brackets.

When the reservoir is being assembled, therefore, it is necessary only to insert the section in the recesses provided to this end and to carry out the assembly operation proper (for example, by thermowelding with a heating plate) just as if the transfer passage did not exist. Since the connection plane between the portions making up the passage coincides with that of the parts making up the reservoir, a single operation is enough to assemble both.

The features and advantages of the invention will become readily apparent from the following description of a preferred embodiment, given by way of example only with with reference to the accompanying drawings, in which:

FIG. 3 is an exploded front view of the reservoir, partly in section and illustrating its two constituent parts before the transfer passage is inserted and the reservoir is assembled;

FIG. 4 is a cross-section through the reservoir after assembly, along line IV—IV in FIG. 2;

Figure 1:
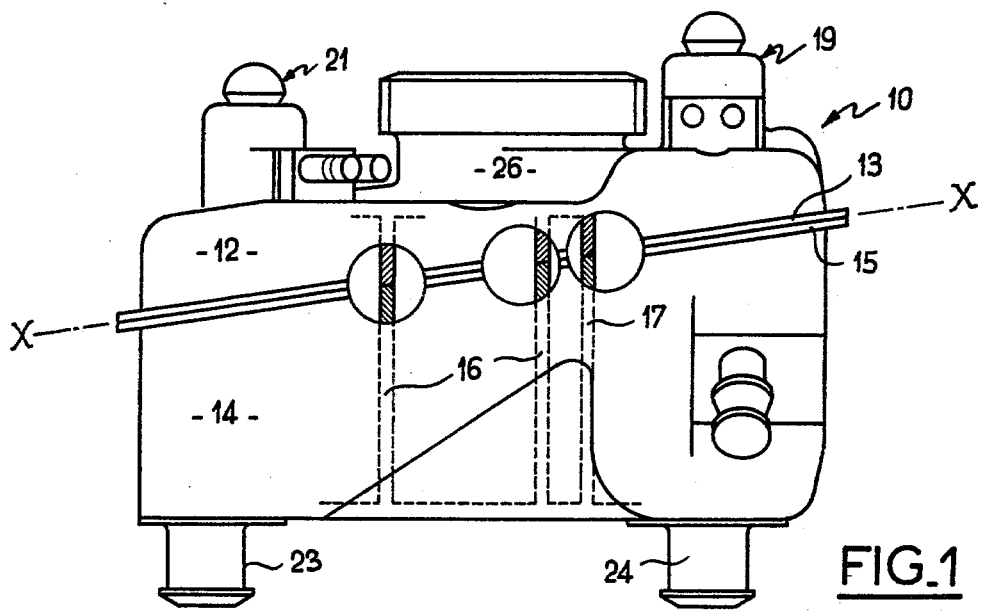
FIG. 1 is a lateral elevation of a fluid reservoir embodying the invention, with parts of the side wall cut away to reveal certain details of its internal structure.

The fluid reservoir 10 illustrated in the drawings is triangular in general shape and made up of two complementary superjacent parts 12, 14. Each of the two reservoir parts is made of a thermoplastic material of appropriate composition, and each has, in the connection plane X—X, a rim in the form of a flange 13 or 15. The two parts of the reservoir will be assembled by means of a thermowelding operation carried out in the plane X—X between the rims 13, 15. This operation may, for example, be performed by the "heating plate" method. As FIG. 1 of the drawings shows, the connection plane X—X is oblique relative to the reservoir bottom. This is because this reservoir is to be mounted on a master cylinder which is itself positioned obliquely, so that in the actual operative position the connection plane X—X will be horizontal and therefore parallel to the surface of the liquid in the reservoir.

Figure 2:
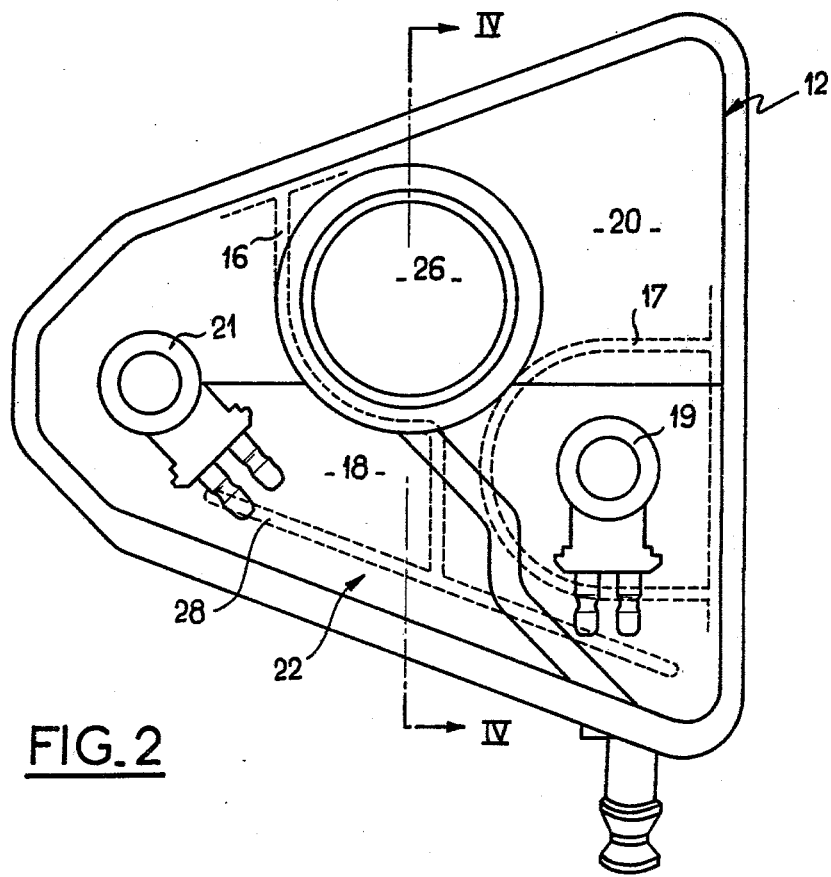
FIG. 2 is a plan view of the reservoir illustrated in FIG. 1.

A transverse partition 16, meandering as shown in FIG. 2, divides the interior of the reservoir 10 into two compartments 18, 20 of similar capacities. This central partition 16 is also formed of two superjacent partition members respectively attached to the upper part 12 and lower part 14 of the reservoir. As the cutaway parts of FIG. 1 indicate, the connection plane for these superjacent elements of the central partition 16 coincides wit that of the parts making up the reservoir, so that these partition members are connected at the same time and in the same thermowelding operation as the two parts of the reservoir. At the end of this operation, the central partition 16 separates the two compartments 18, 20 in a fluid-tight manner, and the two compartments can henceforth communicate only by way of the transfer passage 22 described below. Another partition 17, with a substantially semicircular contour connected to the reservoir rear by straight elements, defines within the compartment 20 a well serving to guide the float of an electrical level measuring device 19 of a conventional type. This partition 17 is designed on the same principle as the central partition 16, with two superjacent elements attached to the two reservoir parts, these elements being interconnected in turn during the assembly operation. Another electrical level measuring device 21 may be provided similarly in the other compartment 18 of the reservoir.

Two outlet orifices 23, 24 in the bottom of the lower reservoir part 14 connect the compartments 18, 20 respectively to the two pressure chambers of a tandem master cylinder, on which the reservoir is mounted. A filler orifice 26 provided in the upper reservoir part 12 leads into the compartment 20 only and is used to fill the reservoir with hydraulic fluid. The fluid poured through the filler orifice 26 first fills the compartment 20 to the level of the transfer passage 22 and then overflow from compartment 20 into compartment 18, which fills in turn. Filling ceases once the fluid is just up to, or slightly above, the bottom of the transfer passage 22 in both compartments. The passage 22 extends deeply enough into the compartments 18, 20 to ensure that if the reservoir tilts about an axis running across the longitudinal axis of the vehicle, for example when the latter is parked on a steep slope or is accelerating or braking sharply, only a fraction of the fluid in one compartment 18 or 20 passes into the other, so that each compartment always retains enough fluid to guarantee reliable brake operation.

In accordance with the invention, the transfer passage 22 itself comprises two complementary, superjacent profiled portions. As FIGS. 3 and 4 show, the upper portion of the passage 22 is defined by the actual side wall 12a of the upper reservoir part 12, by the marginal zone 12b of the top of this reservoir part, adjoining the side wall 12a, and by a vertical rib 28 integral with the said reservoir part and parallel to the said side wall; this upper portion of the transfer passage is thus integral with the upper reservoir part 12. The lower portion 30 of the transfer passage is like a gutter and comprises a substantially U-shaped section resting on the lower reservoir part 14. As best shown in FIG. 4, the uprights of this section 30 point vertically upwards and are aligned respectively with the side wall 12a of the upper reservoir part 12 (to which end the rim 13 of the upper reservoir part is slightly wider here than the rim 15 of its lower part) and with the rib 28. Together, therefore, the two portions making up the transfer passage define a closed section, and the connection plane for these transfer-passage portions coincides with that for the reservoir parts, with the result that they, too, can be interconnected at the same time as the two reservoir parts and in the same assembly operation, e.g. by thermowelding. The transfer passage 22 so formed runs along one of the side walls of the reservoir parallel to the surface of the fluid contained in it, the bottom of the transfer passage being preferably slightly below the maximum fluid level.

Figure 5:
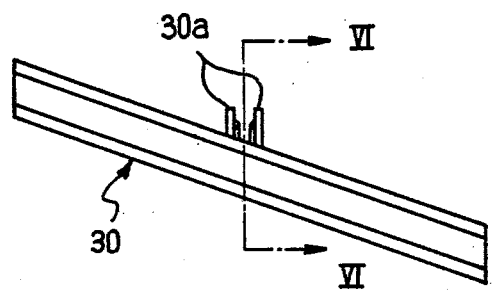
FIG. 5 is a plan view of the transfer passage.
Figure 6:
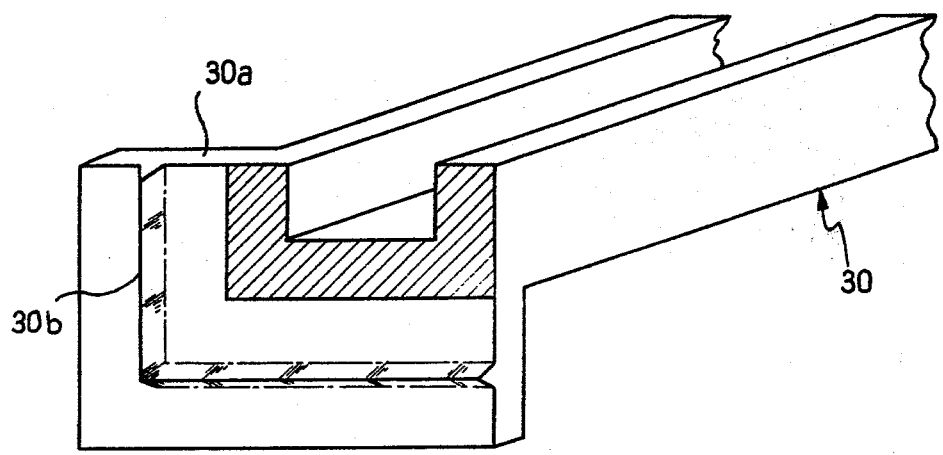
FIG. 6 is a detailed perspective view of the transfer passage on a larger scale, as seen from section line VI—VI in FIG. 5.

The section 30 takes the form of a separate, inserted component and is shown in plan in FIG. 5. Its length is such that the transfer passage extends well into both compartments 18, 20 of the reservoir, for the reasons given above. To ensure correct positioning of the section 30 along the side wall of the reservoir, it is advantageous to provide transverse, vertical partition members 32 which are integral with the lower reservoir part 14 and which act rather as brackets; if so, rectangular recesses shaped to fit the outer perimeter of the section 30 are formed in these partition members 32 and in the central partition 16 of the reservoir (see especially FIG. 3). The various recesses are aligned with one another and also ensure that during the assembly of the reservoir the uprights of the section 30 will be applied uniformly to the side wall 12a and to the rib 28 along the entire length of the transfer passage. Advantageously, also, to ensure correct longitudinal positioning of the section 30, the latter has at least one pair of transverse, parallel flanges 30a designed to frame and grip the central partition 16 of the reservoir, for example, or one or more of the transverse partition members 32. If the section 30 is made of thermoplastic material as the two reservoir parts are, it is easy to form it with integral flanges 30a. As FIG. 6 shows, the mutually facing surfaces of these flanges may bear projecting ribs 30b, for example of triangular cross-section, which form seals with the central partition or with the transverse partition member on which they rest. This expedient can help to ensure a seal between the two reservoir compartments at the bottom of the recess which is provided in the central partition 16 for receiving the section 30.

The sequence of operations for assembly of the reservoir may be readily inferred from the preceding description. With the lower reservoir part 14 placed flat, the section 30 is first inserted by fitting it into the recesses provided for it in the top of the central partition 16 and of the transverse partition members 32, taking care to engage the two flanges 30a on opposite sides of the central partition 16. Once the section 30 is in position, the upper reservoir part 12 is offered up to the lower part 14 bearing the section 30, and the two parts are applied to opposite sides of a heating plate, if the reservoir is to be assembled by the heating-plate method. When the temperature at which the thermoplastic material of the various components softens is reached, the heating plate is rapidly withdrawn, and the two parts 12, 14 are applied to one another under slight pressure in order to connect them by thermowelding. Because the various connection planes defined above all coincide, this operation allows simultaneous interconnection of the two reservoir parts, of the upper and lower portions of the central partition 16 and of the partition 17, and lastly of the two portions of the transfer passage 22. The latter is thus formed without requiring any additional production operation other than insertion of the section 30 in the recesses provided for it in the lower reservoir part 14.

The scope of the invention is not, of course, restricted to the embodiment described above, the latter having been selected by way of example only, but extends to all variants which may be readily conceived, more particularly by substituting equivalent means.

I claim:

1. A fluid reservoir with two compartments, more particularly for supplying hydraulic fluid to tandem master cylinders, comprising two complementary, superjacent parts connected with adhesive, by thermowelding or by any other equivalent method, a central partition attached to the said parts and running across the longitudinal axis of the reservoir to divide the reservoir interior into two compartments having respective outlet orifices, at least one compartment also having a filler orifice, and the two compartments being interconnected by a transfer passage which extends into both of them and runs parallel to the surface of the fluid in the reservoir and substantially at the maximum level for this fluid, characterised in that the transfer passage (22) itself comprises two complementary, superjacent, profiled portions, namely a lower portion (30) substantially forming a gutter mounted on the lower part (14) of the reservoir and an upper portion attached to the upper part (12) of the reservoir, the said portions together defining a closed cross-section, and the connection plane of the portions making up the passage coincides at least approximately with that of the parts making up the reservoir, so that the whole can be assembled in a single operation.

2. A reservoir as claimed in claim 1, characterised in that the transfer passage runs along at least one of the side walls of the reservoir and its upper portion is formed by the actual side wall (12a) of the upper reservoir part, by the adjoining marginal zone of its top (12b) and by a vertical rib (28) integral with the said reservoir part and parallel to the said side wall.

3. A reservoir as claimed in claim 2, characterised in that the lower passage portion comprises a substantially U-shaped section (30) of which the upwardly directed uprights are aligned respectively with the said side wall and with the rib on the upper reservoir part.

4. A reservoir as claimed in claim 3, characterised in that the section (30) is distinct from the lower reservoir part and rests on the bottoms of correspondingly shaped recesses in the central partition (16) of the reservoir and in transverse partition members (32) integral with the lower reservoir part and acting as brackets.

5. A reservoir as claimed in claim 4, characterised in that the section (30) forming the lower passage portion is equipped with at least one pair of transverse, parallel flanges (30a) designed to frame and grip the central partition (16) of the reservoir and/or one or more of the transverse partition members (32) in order to positively position the section longitudinally during the reservoir assembly operations.

6. A reservoir as claimed in claim 5, characterised in that the mutually facing surfaces of the flanges of the section bear projecting ribs (30b) forming a seal with the central partition or transverse partition member on which they rest.

* * * * *